United States Patent [19]

Mizuno et al.

[11] Patent Number: 4,609,953

[45] Date of Patent: Sep. 2, 1986

[54] DISK UNIT

[75] Inventors: Masahiro Mizuno, Chigasaki; Hiroshi Baba, Fujisawa, both of Japan

[73] Assignee: Mitsubishi Denki Kabushiki Kaisha, Japan

[21] Appl. No.: 680,506

[22] Filed: Dec. 11, 1984

[30] Foreign Application Priority Data

Dec. 15, 1983 [JP] Japan ................. 58-236555

[51] Int. Cl.$^4$ ..................... G11B 5/55; G11B 5/56
[52] U.S. Cl. ........................ 360/78; 318/685; 318/696; 360/77
[58] Field of Search ............. 360/77, 78; 318/599, 318/612, 613, 685, 696

[56] References Cited

U.S. PATENT DOCUMENTS

| | | | |
|---|---|---|---|
| 4,254,491 | 3/1981 | Haub et al. | 368/85 |
| 4,383,209 | 5/1983 | Lewis | 318/696 |
| 4,490,665 | 12/1984 | Meyer et al. | 318/696 |
| 4,499,510 | 2/1985 | Harding et al. | 360/77 |
| 4,510,429 | 4/1985 | Squire | 318/696 |
| 4,564,796 | 1/1986 | Yoshino et al. | 318/696 |

FOREIGN PATENT DOCUMENTS 58-35770  3/1983  Japan ................. 360/77

Primary Examiner—George G. Stellar
Attorney, Agent, or Firm—Leydig, Voit & Mayer, Ltd.

[57] ABSTRACT

A disk unit including a control unit for controlling the stop position of a positioning electric motor and positioning a magnetic head operatively linked with the positioning electric motor on a predetermined one of data tracks on a magnetic disk, and positioning error adjustment unit for supplying analog signals to the control unit, wherein the analog signals are related to the positioning error detected by the magnetic head. The control unit includes a control circuit for causing an exciting current which goes high during a time interval T1 and goes low during a time interval T2 during a period T to flow in a first exciting coil of the motor and for causing exciting current which goes low during the same time interval T1 and goes high during the same time interval T2 to flow in another exciting coil adjacent to the first coil, as a function of the magnitude of the aforementioned analog signal; the duration of the time intervals T1 and T2 with respect to the period T is adjusted by the control unit.

3 Claims, 24 Drawing Figures

FIG. 1
FIG. 2
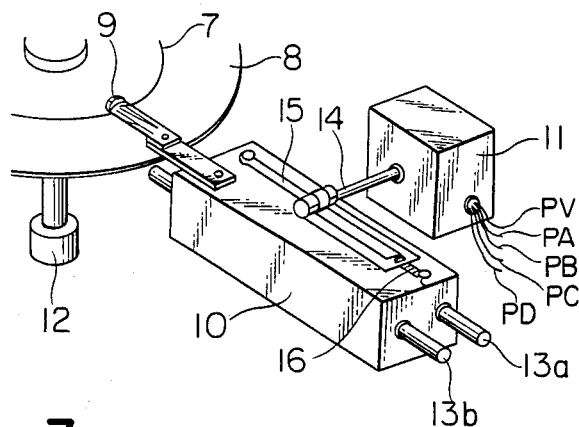
FIG. 3
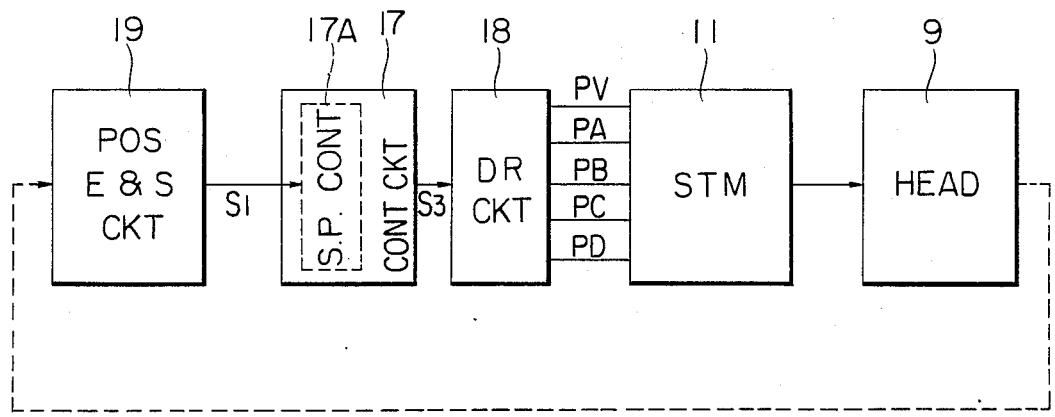
FIG. 4
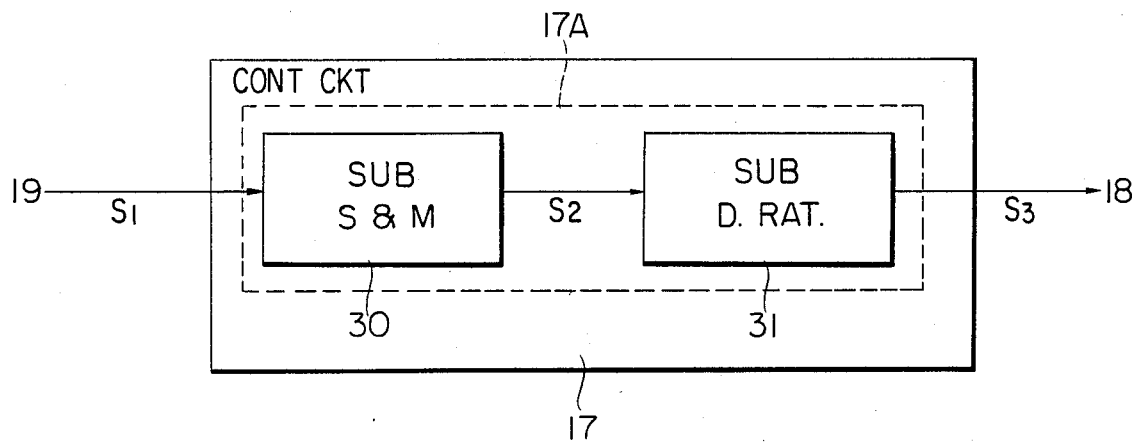

(a) SIG TO GA (b) iA (c) SIG TO GD (d) iD (e) SIG TO GB    L (f) iB    0    IB = 0

(g) SIG TO GC    L (h) iC    0    IC = 0

DISK UNIT

BACKGROUND OF THE INVENTION

In the following description, a disk is defined as a magnetic disk and a head is defined as a magnetic head.

This invention relates to a magnetic disk unit used in an electronic computer or as a storage device and more particularly to adjustment of the stop position of the magnetic head operatively linked with a driving stepping motor.

Recently, IC memories, magnetic tapes or magnetic disks are used as storage devices. However, IC memories are inconvenient in that they are volatile and the memory contents are lost when the electrical source is turned off inadvertently. Moreover, their storage capacity is rather low. Magnetic tapes are inconvenient for high speed data processing because of prolonged time involved in data retrieval. Thus a magnetic disk having a larger storage capacity and allowing for shorter accessing time has been desirable.

FIG. 1 shows an overall view of the conventional magnetic disk unit. A magnetic disk 1 has a number of concentrically arranged data tracks designed for data storage and can be rotated at a constant speed with the rotation of a spindle motor 2 for the reading or writing of data. A magnetic head 3 is positioned so that it is phasing both sides of the disk 1 at a small distance from the surfaces of the disk 1 and is moved along the disk surface to effect the reading or writing operations. The head 3 is moved by an actuator 5 driven by a stepping motor 4. The motors 2, 4 and the actuator are secured on a base 6. For correct data writing and reading into and from the magnetic disk 1, the magnetic head 3 needs to be stopped accurately on a selected one of the data tracks of the disk 1 without any positioning error.

In the conventional device, however, the stop position of the magnetic head 3 is governed by the stop angle of the stepping motor. The stepping motor is rotated stepwise although the step angle is small. However, even when the ambient temperature changes only slightly, the stop position of the magnetic head 3 on the selected track of the disk may deviate due to thermal expansions of the magnetic disk 1, actuator 5 and the base 6. This results in data reliability loss on account of the magnetic interference between the neighboring tracks. This presents problems when the number of tracks on the disk is to be increased.

SUMMARY OF THE INVENTION

It is an object of the present invention to provide a magnetic disk unit in which the above drawbacks of the prior art are eliminated. In the magnetic disk unit of the present invention, exciting currents which are out of phase by 180° with respect to each other are caused to flow in two adjacent phases of the driving stepping motor. Stop position adjustment means comprised of a position error sensing circuit 30 capable of changing the duty ratio of the exciting currents and a circuit 31 for determining the driving input pulse duty ratio are provided in such a manner that adjustment is made in the time interval during which one of the exciting currents goes high and the other current goes low during a pulse period T or a time interval T2 during which the one exciting current goes low and the other current goes high so that the data can be positively read from or written into the data track of the disk surface.

BRIEF DESCRIPTION OF THE DRAWINGS

FIG. 1 is a diagrammatic view of the conventional magnetic disk unit;

FIG. 2 is a diagrammatic view of the magnetic disk unit of the present invention;

FIG. 3 is a block diagram showing the overall unit of the present invention;

FIG. 4 is a block diagram showing in detail a stop position adjustment section 17A shown in FIG. 3;

PREFERRED EMBODIMENTS OF THE INVENTION

Figure 5:
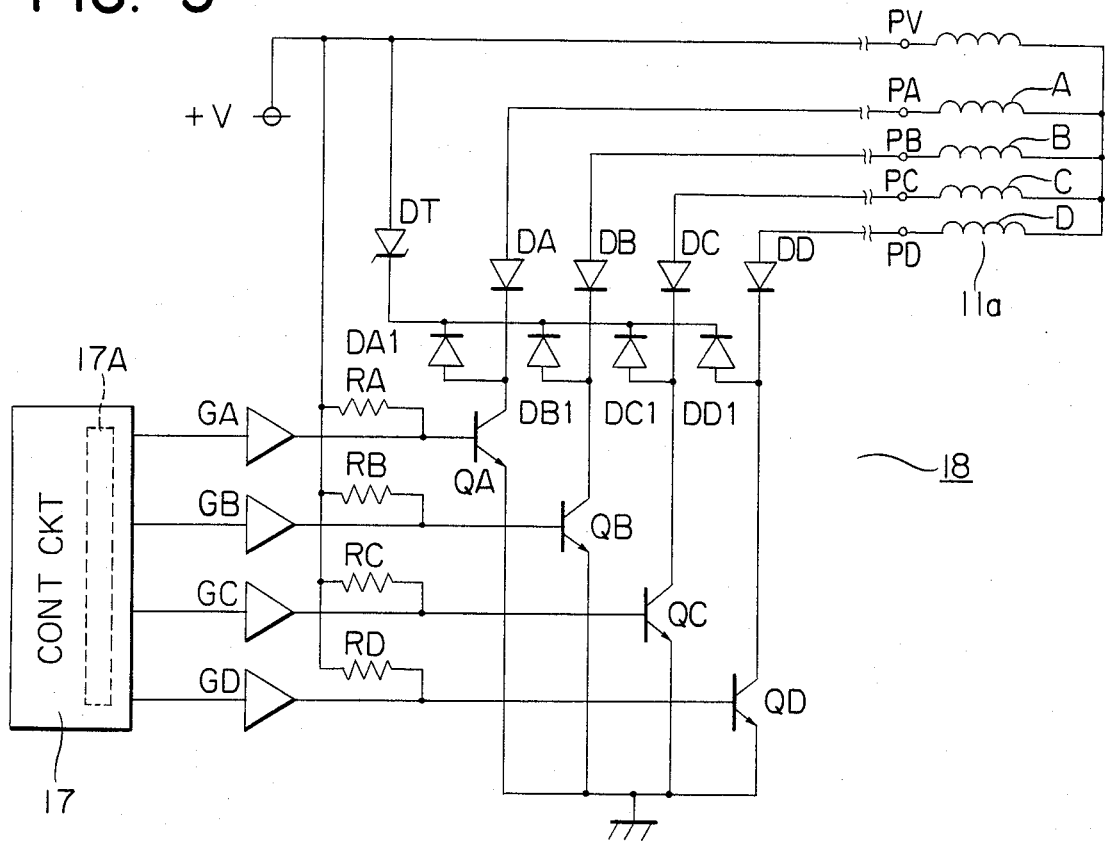
FIG. 5 is a circuit diagram showing a driving circuit and the control circuit of the present invention.

A preferred embodiment of the present invention is hereafter explained with reference to the accompanying drawings.

FIG. 2 shows a perspective view of a magnetic disk unit embodying the present invention. Referring to the figure there are provided on a base, not shown, a magnetic disk 8 adapted for data recording and storage and having a plurality of concentrically arranged magnetic tracks 7, a carriage 10 adapted for positioning a magnetic head 9, and a stepping motor 11 for effecting a translatory movement of the carriage 10. A spindle motor 12 for effecting rotation of the magnetic disk 8 is provided on the lower side of the disk 8. The carriage 10 has formed therethrough a pair of longitudinal through-holes through which a pair of guide rods 13a, 13b are passed so that the carriage can perform translatory movement along these guide rods. In this manner, the magnetic head 9 attached to the carriage 10 can also travel along the disk 8 with the translatory movement of the carriage 10. A rotor shaft 14 of the stepping motor 11 imparts a driving force for causing the translatory movement of the carriage 10 through means of a transmission belt 15 which is held under tension by a spring 15. Four exciting coils 11a are enclosed in the stepping motor 11 for causing rotation of a rotor shown in FIG. 4. Four terminals PA, PB, PC and PD of the exciting coils 11a and a common terminal PV for these exciting coils are externally provided on the stepping motor 11.

FIG. 3 shows a block diagram of a positioning error correcting and control circuit having a positioning error sensing circuit 19 which senses the magnitude of the positioning error by 2-bit or 3-bit signals, a control circuit 17 and a driving circuit 18 according to the present invention. As will become apparent from the ensuing description, the magnitude of the positioning error is sensed by the sensing circuit 19 and a stop position control section 17A of the circuit 17 is controlled for automatically cancelling the positioning error.

FIG. 5 shows an overall circuit employed in the magnetic disk unit of the present invention. More specifically, the circuit comprises a control circuit 17 for controlling the current flowing in the exciting coils and the driving circuit 18 mentioned above. A voltage V is applied via terminal PV to one end of phases A, B, C and D of the exciting coils 11a, the other ends of which are connected to the collector terminals of switching transistors QA, QB, QC and QD via diodes DA, DB, DC and DD, respectively. The inputs of non-inverting gates GA, GB, GC and GD are connected to outputs of the control circuit 17 and their respective outputs are connected to the base terminals of the transistors QA, QB, QC and QD so that the base potentials of these transistors are controlled as a function of input signals applied to the gates from the control circuit 17. In this manner, the electrical connection between the collectors and grounded emitters of the transistors QA to QD is turned on and off in dependence upon the base signals.

Resistors RA, RB, RC and RD for applying bias currents to the base electrodes of the transistors QA to QD, respectively, are connected between the source +V and the respective connections between the base electrodes of the transistors QA to QD and the gates GA to GD. Diodes DA1, DB1, DC1 and DD1 are connected at first ends thereof to one terminal of a common Zener diode DT adapted for absorbing a surge voltage produced in the respective phases of the exciting coils and at the respective other ends thereof the connection points between diodes DA to DD and the collector electrodes of the transistors QA to QD, respectively. The stop position control section 17A is used for controlling the duty ratio of the output pulses, that is, the input pulses to the driving circuit 18 and comprises a subsection 30 for determining the sense and magnitude of the positioning error and a subsection 31 for determining the duty ratio of the driving input pulse.

In the above described construction, control signals are introduced from the control circuit 17 to the driving circuit 18 which then causes an exciting current to flow in the exciting coils 11a of the stepping motor 11 in accordance with the control signals. The exciting current causes the rotor shaft 14 of the stepping motor 11 to be rotated so as to cause the translatory movement of the carriage 10 so that the magnetic disk 9 is moved to and stopped on a selected one of the data tracks 7. When the stop position of the magnetic head 9 is in correct registery with the desired track 7, data may be written into or read out of the track 7 by the magnetic head 9. The section 17A performs a fine adjustment of the stop position of the magnetic head 9 for correcting the stop position error in a manner as later described.

Figure 6:
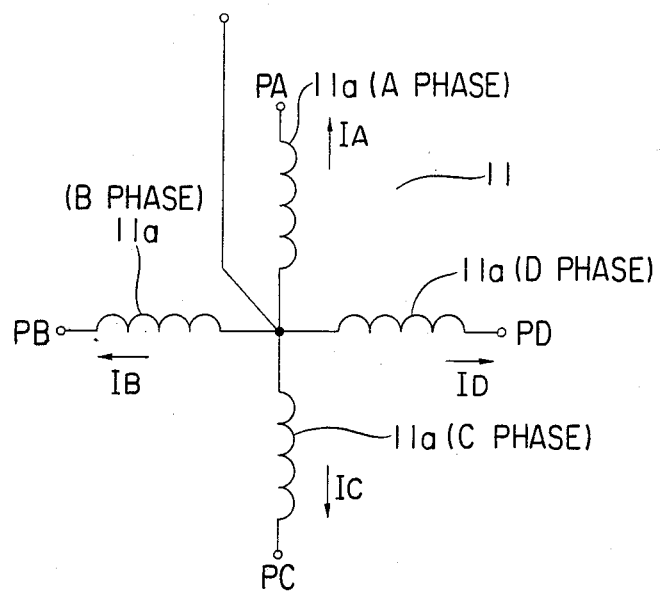
FIG. 6 is a diagrammatic connection diagram of the exciting coils in the stepping motor.

The four exciting coils 11a of the stepping motor 11 are designated phases A, B, C and D (FIG. 6). The currents flowing in these phases are designated IA, IB, IC and ID. These exciting currents are supplied through the common terminal PV.

Figure 7A:
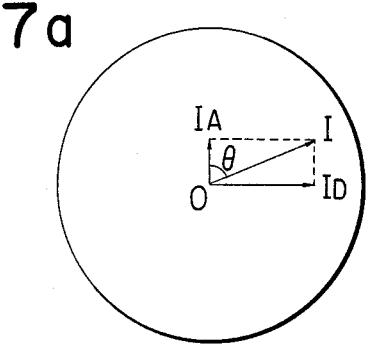
FIG. 7a is an explanatory view showing a resultant electrical angle of the exciting coils.

The method of exciting only one of the four phases is herein referred to as one-phase excitation, while the method of exciting two phases is herein referred to as two-phase excitation, and the method consisting of the combination of the one-phase excitation and two-phase excitation is herein referred to as one phase-two phase excitation. The two phase excitation is now explained. While the current IA in phase A and the current ID in phase D form an electrical angle equal to 90° C., the electromagnetic force acting on the rotor of the stepping motor 11 is in the direction of the resultant electrical angles of the currents IA and ID as shown in FIG. 7A. In this figure, an angle $\Theta$ is $\angle$IA·O·I where the angle O is depended on the direction of IA in the stepping motor and the magnitude of the electromagnetic force I in the rotor 14 is given by $I=\sqrt{IA^2+ID^2}$. Therefore, when the currents IA and ID are caused to flow in the phases A and D, respectively, the rotor is stopped at a position defined by the angle $\Theta$ with respect to a reference direction in the stepping motor 11. The magnitude of the torque induced when the rotor is fixed at the angle $\Theta$ is proportionate to the magnitude of the electromotive force mentioned above.

Figure 7B:
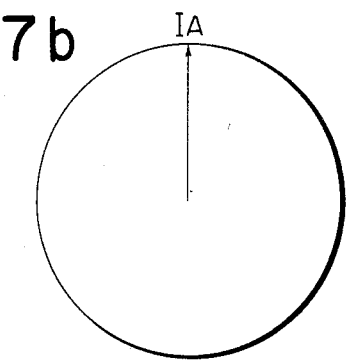
FIG. 7b is an explanatory view showing the resultant electrical angle for the case where the current is allowed to flow only in the phase A of the exciting coil.
Figure 7C:
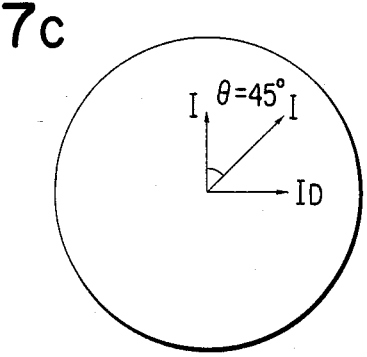
FIG. 7c is an explanatory view showing the resultant electrical angle for the case where currents of equal magnitudes are allowed to flow the phases A and D of the coils.
Figure 7D:
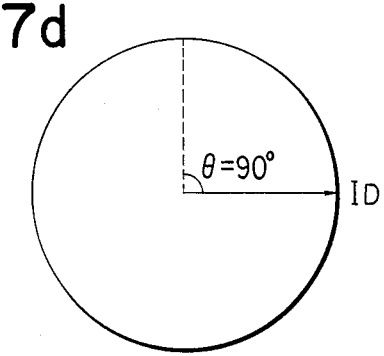
FIG. 7d is an explanatory view showing the resultant electrical angle for the case where the current is allowed to flow only in the phase D of the coil.

FIGS. 7b to 7d show changes in the electric current flowing in the phases A to D when the resultant angle $\Theta$ is changed from 0° to 90°. When ID=0, the resultant angle $\Theta$ is zero (FIG. 7b). This situation occurs when only the phase A is excited (one-phase excitation). When IA=ID, the resultant angle $\Theta$ is 45° (FIG. 7c). When IA=0, the resultant angle $\Theta$ is 90° (FIG. 7d). This situation arises when only the phase D is excited (one-phase excitation).

From this it follows that, when the current flowing in phase D is gradually increased from zero while conversely the current flowing in the phase A is gradually decreased, the resultant electrical angle $\Theta$ can be changed from 0° to 90° so that a desired angle can be selected.

When it is desired to change the electrical angle $\Theta$ in the range of 90° to 180°, it suffices to adjust the current IC in phase C and the current ID in phase D. Similarly, for the electrical angle $\Theta$ in the range of 180° to 270° and in the range of 270° to 360°, it suffices to adjust the currents IA and IB, respectively.

It will be appreciated from the foregoing that any desired resultant angle $\Theta$ can be achieved by selecting two of the neighboring exciting phases and adjusting the currents flowing in the respective phases.

The resultant electric angle Θ can be changed by changing the magnitudes of the currents IA to ID so that the rotor shaft 14 of the stepping motor 11 is rotated stepwise in response thereto, whereby the carriage 10 is moved to a position corresponding to the resultant electric angle Θ with the guide rods 13a, 13b. Accordingly, the stop position of the magnetic head 9 can be adjusted to any desired point on the data disk 8 when the current flowing in the phases A to D is changed as desired.

The operation of controlling the stop angle of the stepping motor 11 is explained herebelow in connection with the control circuit 17 and the driving circuit 18 shown in FIGS. 3 to 5.

Responsive to analog signals from the positioning error sensing circuit 19 (which senses the positioning error of the magnetic head 9 as the magnitude of positioning error with the aid of 2-bit or 3-bit signals), the subsection 30 calculates the sense and magnitude of the positioning error and issues an output signal S2 to the subsection 31, which then calculates on the basis of the signal S2 a duty ratio for cancelling the magnitude of the positioning error, and sends the same to the driving circuit 18 as a signal S3.

Figure 8:
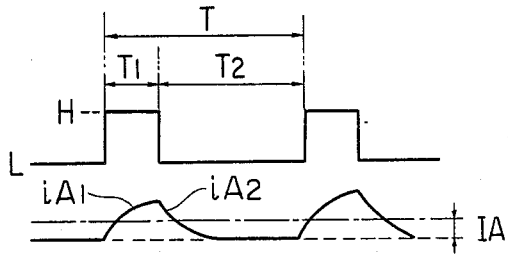
FIGS. 8a to 8h are waveform diagrams showing the input signals as a function of the exciting current.
Figure 8:
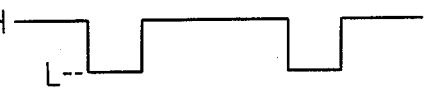
Figure 8:
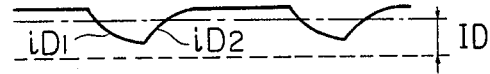
Figure 8:
Figure 8:
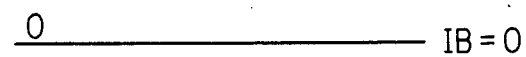
Figure 8:
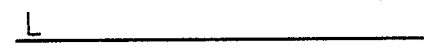
Figure 8:

In the course of one period T, the signal S3 is applied from control circuit 17 to gate GA during time interval T1 as a high level signal and during time interval T2 as a low level signal (FIG. 8a), to the gate GD is applied a low level signal during the time interval T1 and a high level signal during the time interval T2 from control circuit 17. Thus the input signals to the gates GA and GD are phase shifted 180° with respect to each other. Each of the input pulses to the gates GA and GD has a period T. The output from the gate GA goes high during time interval T1 so that the collector to emitter passage of the transistor QA is rendered conductive and an instantaneous current iA1 flows through phase A via diode DA. Next, during time interval T2, the output signal from gate GA goes low so that the collector to emitter passage of transistor QA is rendered nonconductive. However, surge current iA2 flows through phase A. These currents iA1, iA2 present approximately exponential waveforms because of the inductance of the excitor coils. Hence, the current iA flowing in the phase A has the waveform as shown in FIG. 8b. Averaging the waveform of the current iA over the period T, the mean current or exciting current IA is expressed as $$IA = 1/T \cdot \int_0^T (iA1 + iA2) \, dt.$$

Turning now to the gate GD, the signal shown in FIG. 8c is supplied from the control circuit 17 so as to render the collector to emitter passage of the transistor QD conductive and then nonconductive in a similar manner. Thus the current shown in FIG. 8d flows in the phase D. The mean current or the excitor current ID is expressed as $$ID = 1/T \cdot \int_0^T (iD1 + iD2) \, dt.$$

Turning then to the gates GB and GC, since the low level signal is applied to these gates from the control circuit as shown in FIGS. 8e and 8j, the exciting currents flowing in the phases B and C are zero (FIGS. 8f and 8h).

Figure 9:
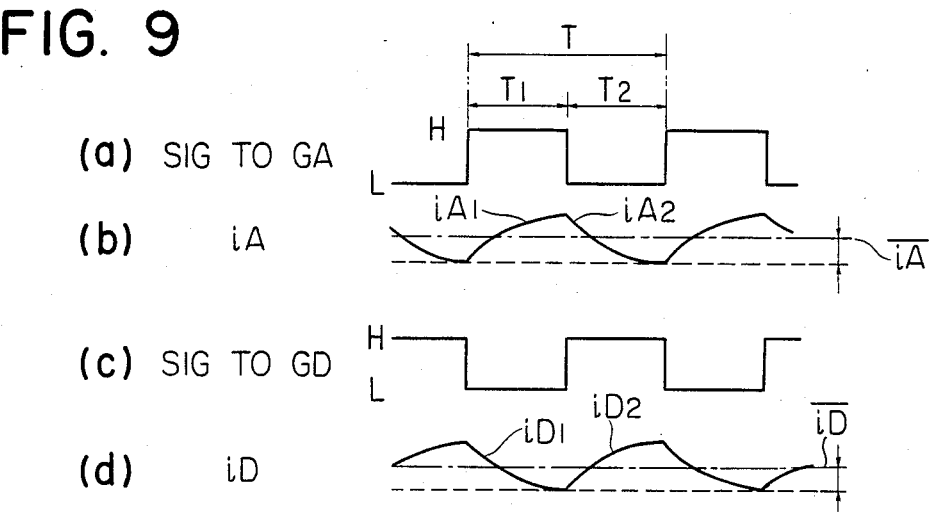
FIG. 9 consisting of FIGS. 9a-9d shows timing charts for an input pulse duty cycle equal to 50 percent.

FIG. 9 shows the case wherein the time intervals T1, T2 are such that T1=T2 during the same period T. A signal shown in FIG. 9a is applied to the gate GA, while a signal shown in FIG. 9c is applied to the gate GD. The currents iA, iB flowing at this time in the phases A and D present waveforms shown in FIGS. 9b and 9d. Since the currents iA, iB are symmetrical to each other, iA1=iD2 and iA2=iD1. Hence the exciting currents IA and ID are equal to each other.

In this manner, the exciting currents flowing in the phases A and D of the exciting coils can be changed when the time during which the signals phase shift 180° C. with respect to each other are supplied from the control circuit 17 to the gates GA and GD is changed at the stop position control section 17A, or in other words, when the duty cycle of these two signals is changed. By changing the exciting current in this manner, the aforementioned resultant electric angle Θ is changed and hence the rotational angle of the rotor 14 is also changed for effecting fine adjustment of the stop position of the magnetic head 9.

The currents flowing in the respective phases when the time interval T1 during which the signals are supplied from the control circuit 17 to the gates GA, GD with 180° phase shift is changed at the stop position control section 17A, are now considered.

Figure 10:
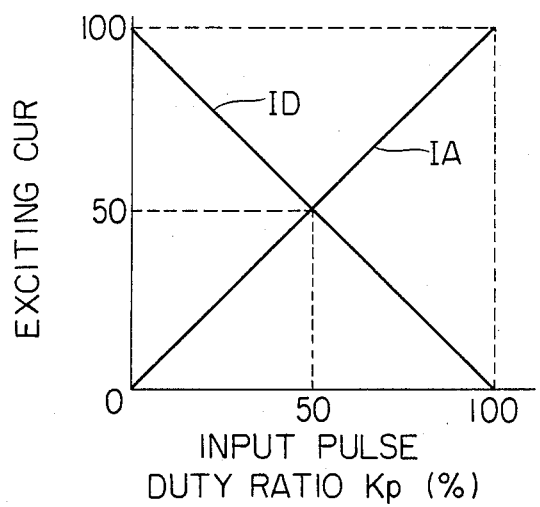
FIG. 10 shows changes in the exciting current caused by changes in the input pulse duty ratio.

FIG. 10 shows the exciting currents iA, iB in the phases A and D of the exciting coils A, D as a function of the input pulse duty ratio K. The input pulse duty ratio K herein is defined as the ratio of the time interval T1 with respect to the period T during which the high signal is introduced to the gate GA and the low signal is introduced to the gate GD. Hence the input pulse duty ratio K is expressed as K=T1/T, wherein (T=T1+T2). For convenience, it is usually expressed as a percentage, so Kp=T1/T×100.

For 0% input pulse duty ratio, the exciting current IA is zero (0%) whereas ID accounts for 100%. Hence, only the phase D is excited (one-phase excitation). With the input pulse duty ratio of 50%, the exciting currents IA and ID are equal to each other so that the phases A and D are excited (two-phase excitation). With the input pulse duty ratio of 100%, the exciting currents IA and ID account for 100% and 0%, respectively, so that only the phase A is excited (one-phase excitation).

Hence, the magnitudes of the exciting currents IA and ID can be changed as desired by changing the input pulse duty ratio Kp at the stop position control section 17A.

Figure 11:
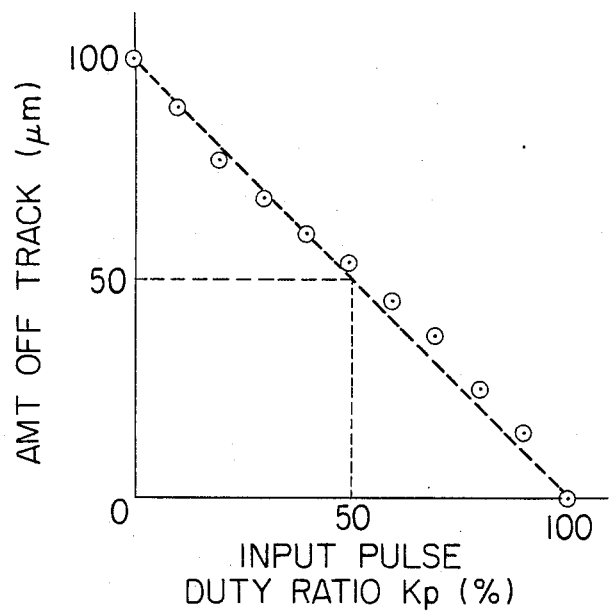
FIG. 11 is a chart showing changes in carriage offset caused by changes in the input pulse duty ratio K.

FIG. 11 shows measured values of tracking offset for the input pulse duty ratio Kp changed from zero to 100% with the width of one track being 100 microns.

Hence, any desired tracking offset or error can be obtained by changing the input pulse duty ratio Kp. The exciting currents flowing in the phases C-D, B-C and A-B can be controlled in the similar manner by suitable selecting the pulse duty ratio Kp of the input pulses supplied from the control circuit 17 to the gates GA to GD.

As described hereinabove, any desired tracking offset can be obtained by changing the input pulse duty ratio Kp at the stop position control section and, in the event that the magnetic head 9 has deviated or become offset with respect to the data track 7, the magnetic head position can be accurately corrected by changing the input pulse duty ratio Kp. Hence, the stop position of the magnetic head 9 can be positively corrected by appropriately setting the input pulse duty ratio Kp in response to dimensional errors, thermal expansion or other relevant data of the component parts. For example, when the magnetic head 9 has become offset with respect to the data track 7, the input pulse duty ratio Kp is induced in a direction to cancel the offset or positioning error.

FIG. 3 shows in block form a positioning error correcting and controlling circuit connected to the positioning error sensing circuit 19 which senses the magnitude of the positioning error by 2-bit or 3-bit signals, comprising the control circuit 17 and the driving circuit 18 of the present invention. According to the present invention, the magnitude of the positioning error can be cancelled automatically by sensing the positioning error in the sensing circuit 19 and controlling the stop position control section 17A of the control circuit 17.

It should be noted that the transistors QA to QD of the driving circuit 16 perform a switching operation between the conducting state and the nonconducting state instead of an analog operation so that the operation is highly reliable with a lower power consumption.

The present invention is not limited to the foregoing embodiment. For example, the output of the control circuit 17 may control the gates GA to GD of the driving circuit by digital logic so that, for example, a microprocessor can be used as a control circuit 17 instead of using the discrete logic circuit. Although four-phase unipolar type driving circuit 18 is used in the present embodiment, bipolar or other driving circuits may also be used within the scope of the present invention.

From the foregoing it is seem that the present invention provides an arrangement in which the exciting currents of opposite phase are caused to flow in two neighboring phases of the stepping motor and the duty ratio of these two-phase exciting currents is changed for adjusting the time interval T1 within one period T during which the one exciting current goes high and the other goes low or the time interval T2 with the same period T during which said one current goes low and said other current goes high so that the positioning error between the magnetic head and the data track can be corrected positively.

In this manner, any deviation in the stop position caused by changes in ambient temperature can be corrected easily so as to provide for a highly reliable recording and/or retrieval.

What is claimed is:

1. A disk unit comprising control means for controlling the stop position of a positioning electric motor and for positioning a head operatively linked with said positioning electric motor on a predetermined one of data tracks on a disk, and positioning error adjustment means for supplying analog signals to stop position adjustment means, said analog signals being related to the positioning error detected by the head, said control means including a control circuit for causing an exciting current which goes high for a time interval T1 and goes low for a time interval T2 during a period T to flow in one of the exciting coils of said positioning electric motor, and for causing an exciting current which goes low during the same time interval T1 and goes high during the same time interval T2 to flow in another exciting coil adjacent to said one of the exciting coils, as a function of the magnitude of said analog signals from said positioning error adjustment means, said stop position adjustment means being operative for adjusting the duration of said time intervals T1 or T2 with respect to said period T.

2. The disk unit according to claim 1 wherein said stop position adjustment means comprises means for calculating the sense and the magnitude of the positioning error as a function of said analog signals and outputting a corresponding signal S2 and means for determining the duty ratio of the stepping motor driving input pulse on the basis of said output signal S2 and outputting a corresponding signal S3.

3. The disk unit according to claim 1 wherein the positioning electric motor is a stepping motor.

* * * * *